2,693,090

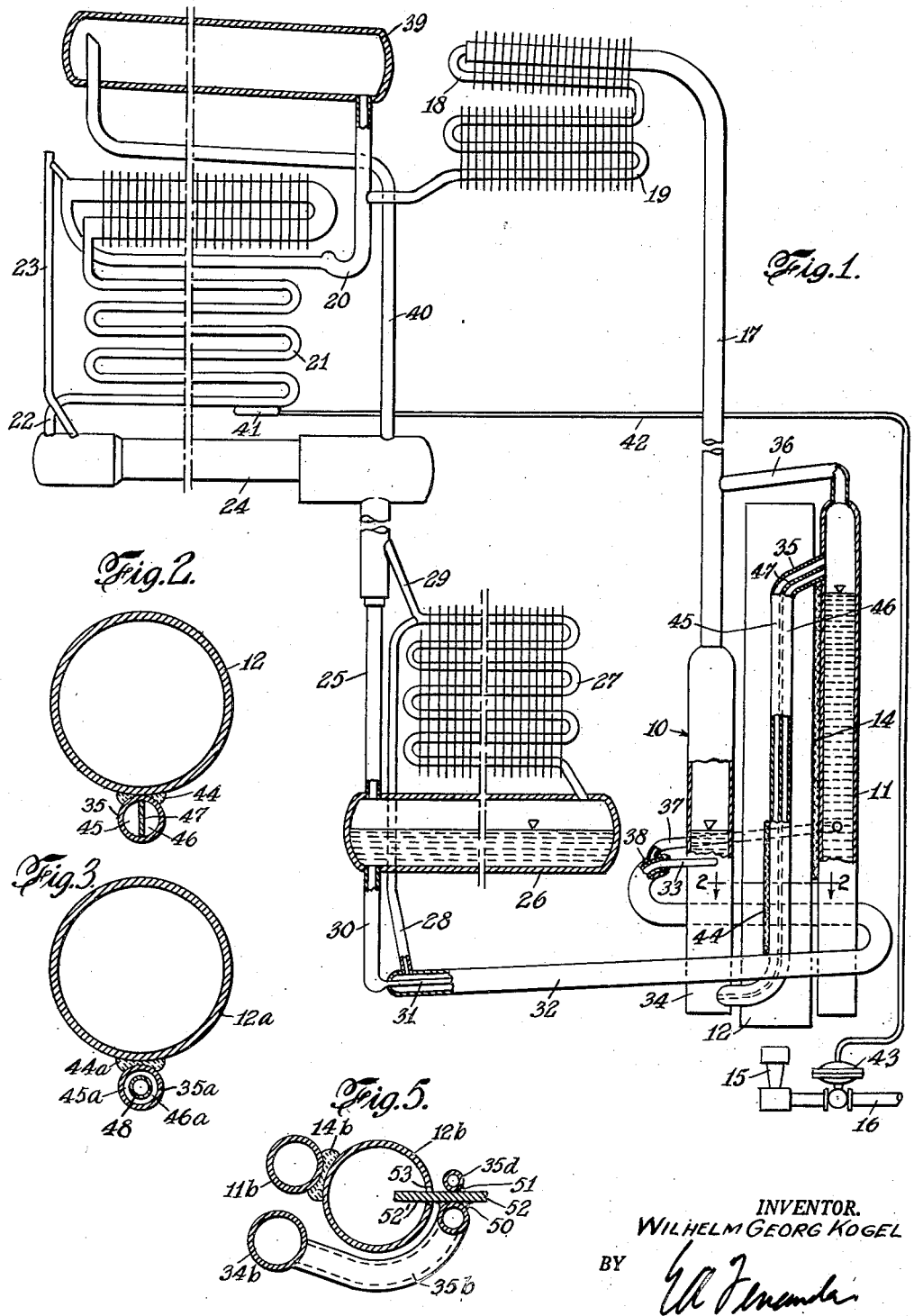

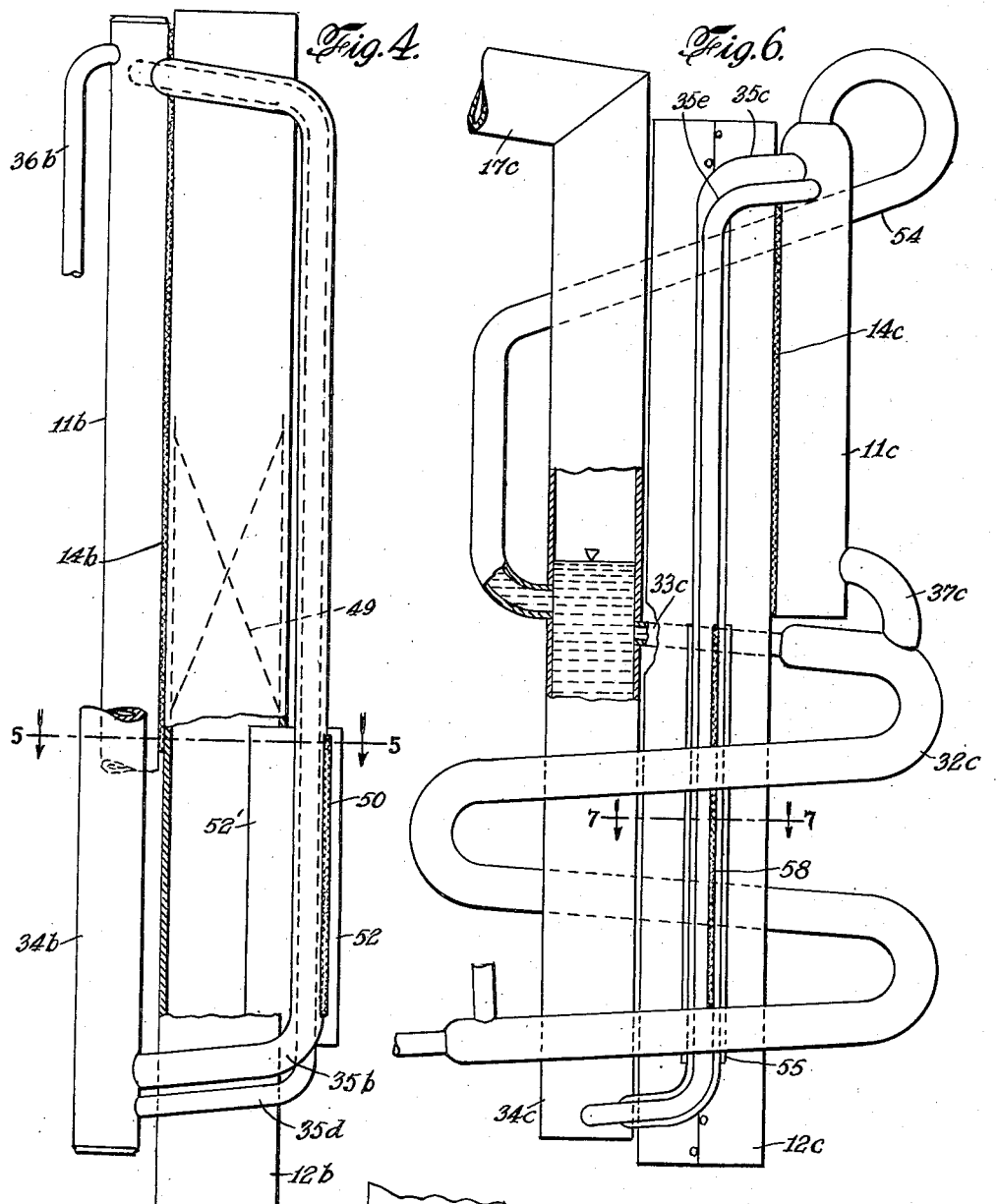

ABSORPTION REFRIGERATION SYSTEM

Wilhelm Georg Kögel, Stockholm, Sweden, assignor to Aktiebolaget Elektrolux, Stockholm, Sweden, a corporation of Sweden Application August 19, 1950, Serial No. 180,478

Claims priority, application Sweden August 25, 1949

14 Claims. (Cl. 62—119.5)

My invention relates to refrigeration systems of the absorption type and is especially useful in such systems operated by a fluid fuel burner.

It is an object of my invention to effect improvements in the manner in which circulation of absorption solution is effected in systems of this type, particularly to provide new arrangements to insure raising or pumping of liquid by vapor lift action when a fluid fuel burner operates with a pilot flame and heat is being supplied at minimum heat input to the system.

The novel features which I believe to be characteristic of my invention are set forth with particularity in the claims. The invention, both as to organization and method, together with the above and other objects and advantages thereof, will be better understood by reference to the following description taken in connection with the accompanying drawings forming a part of this specification, and of which:

Fig. 1 diagrammatically illustrates an absorption refrigeration system embodying the invention;

Fig. 2 is a fragmentary sectional view taken on line 2—2 of Fig. 1;

Fig. 3 is a sectional view similar to Fig. 2 illustrating another form of construction;

Fig. 4 is a fragmentary view of a refrigeration system similar to that shown in Fig. 1 illustrating another embodiment of the invention;

Fig. 5 is a sectional view taken on line 5—5 of Fig. 4;

Fig. 6 is a fragmentary view of a refrigerating system like that shown in Fig. 1 illustrating a further embodiment of the invention;

Fig. 7 is a sectional view taken on line 7—7 of Fig. 6; and

Fig. 8 is a fragmentary view in elevation of a detail to illustrate more clearly the construction of the embodiment of Fig. 6.

Referring to Fig. 1, I have shown my invention in connection with an absorption refrigeration system of a uniform pressure type which is well known in the art and in which an inert pressure equalizing gas is employed. Such a refrigeration system comprises a generator or vapor expulsion unit 10 including a generator or boiler 11 containing a refrigerant, such as ammonia, in solution in a body of absorption liquid, such as water. Heat is supplied to the boiler 11 from a heating tube or flue 12 thermally connected therewith at 14, as by welding, for example. The heating tube 12 may be heated in any suitable manner, as by a liquid or gaseous fuel burner which is adapted to project its flame into the lower end of the tube. In Fig. 1 the heating tube 12 is arranged to be heated by a gas burner 15 to which a suitable combustible gas is delivered through a conduit 16.

The heat supplied to the boiler 11 and its contents expels refrigerant vapor out of solution, and, in a manner to be described presently, the refrigerant vapor passes upwardly from the vapor expulsion unit 10 through a conduit 17 and through an air cooled rectifier 18 into an air cooled condenser 19 in which it is condensed and liquefied. Liquid refrigerant flows from condenser 19 through a conduit 20 into a cooling element 21 in which it evaporates and diffuses into an inert pressure equalizing gas, such as hydrogen, which enters through a conduit 22. Due to evaporation of refrigerant fluid into inert gas in cooling element 21, a refrigerating effect is produced with consequent absorption of heat from the surroundings.

The rich gas mixture of refrigerant vapor and inert gas formed in cooling element 21 flows from the upper part thereof through a conduit 23, one passage of a gas heat exchanger 24, conduit 25 and absorber vessel 26 into the lower end of an absorber coil 27. In absorber coil 27 the rich gas mixture flows counter-current to downwardly flowing absorption liquid which enters through a conduit 28. The absorption liquid absorbs refrigerant vapor from inert gas and inert gas weak in refrigerant flows from absorber coil 27 in a path of flow including a conduit 29, another passage of gas heat exchanger 24 and conduit 22 into the lower part of cooling element 21.

The circulation of gas in the gas circuit just described is due to the difference in specific weight of the columns of gas rich and weak, respectively, in refrigerant vapor. Since the column of gas rich in refrigerant vapor and flowing from cooling element 21 to the absorber coil 27 is heavier than the gas weak in refrigerant and flowing from the absorber coil 27 to cooling element 21, a force is produced or developed within the system for causing circulation of inert gas in the manner described.

Absorption solution enriched in refrigerant flows from the absorber vessel 26 through a conduit 30 and an inner passage or pipe 31 of liquid heat exchanger 32 disposed about the lower part of the vapor expulsion unit 10. Enriched absorption solution flows from the inner pipe 31 of the liquid heat exchanger through a conduit 33 and vertical pipe 34 into the lower end of a vapor lift tube 35 through which liquid is raised by vapor-liquid lift action to a higher level in the vapor expulsion unit 10 in a manner to be explained presently. Refrigerant vapor expelled out of solution introduced into boiler 11, together with vapor entering through tube 35, flows upwardly from the vapor expulsion unit 10 through conduits 36 and 17 to the condenser 19, as previously explained. It will also be seen that the lower end of conduit 17 is connected to pipe 34 for venting vapor from the latter. The absorption liquid from which refrigerant vapor has been expelled flows from the boiler 11 through a conduit 37, outer pipe or passage 38 of liquid heat exchanger 32 and conduit 28 into the upper part of absorber coil 25. The circulation of absorption solution in the liquid circuit just described is effected by raising of liquid through tube 35.

The outlet end of condenser 19 is connected by an upper extension of conduit 20, vessel 39 and conduit 40 to a part of the gas circuit, as at one end of gas heat exchanger 24, for example, so that any inert gas which may pass through the condenser 19 can flow into the gas circuit. Refrigerant vapor not liquefied in the condenser flows through the upper part of conduit 20 to displace inert gas in vessel 39 and force such gas into the gas circuit. The effect of forcing gas into the gas circuit in this manner is to raise the total pressure in the entire system, whereby an adequate condensing pressure is obtained to insure condensation of refrigerant vapor in condenser 19.

The refrigeration system just described may be controlled by a thermal bulb 41 arranged in thermal exchange relation with the bottom part of cooling element 21 and connected by a conduit 42 to a control device 43 which is connected in the fuel supply conduit 16. The thermal bulb 41 and conduit 42 may form part of an expansible fluid thermostat which is charged with a suitable volatile fluid for operating the control device 43 with changes in temperature of cooling element 21, in a manner well known in the art. When the temperature of cooling element 21 increases due to an increase in load on the cooling element, thermal bulb 41 becomes effective to operate control device 43 to increase the supply of fuel to burner 15 whereby the latter operates with a normal or maximum flame and heat is supplied at "maximum" heat input to the vapor expulsion unit 10. Under these conditions refrigerant vapor is expelled from solution in vapor expulsion unit 10 at an increased rate, thereby increasing the amount of refrigerant vapor which condenses in condenser 19 and flows into cooling element 21.

Conversely, when the temperature of cooling element 21 decreases, the thermal bulb 41 becomes effective to operate control device 43 to decrease the supply of fuel to burner 15 whereby the latter operates with a pilot flame and heat is supplied at a "minimum" or reduced heat input to the vapor expulsion unit 10. Under these conditions, the rate at which refrigerant vapor is expelled out of solution in the vapor expulsion unit 10 is reduced, thereby decreasing the amount of refrigerant vapor which condenses in condenser 19 and flows into cooling element 21.

The lift tube 35 is heat conductively connected at 44 to the heating tube 12, as by welding, for example. The tube 35 is of such internal diameter that raising of liquid therethrough by vapor lift action can be readily effected when the gas burner 15 is operating with a normal or maximum flame. In such case vapor is evolved at a sufficiently rapid rate to effect lifting of liquid, the vapor bubbles being incapable of freely passing liquid in the tube 35. However, when the burner 15 is operating with a pilot or minimum flame, the rate at which vapor is expelled from solution in a lift tube of the size of tube 35 often is insufficient to effect lifting of liquid by vapor lift action. This is so because refrigerant vaporizes at a relatively slow rate during periods of minimum heat input, such supply of heat to the lift tube being steady and constant with pilot flame operation and the solution in the lift tube eventually becoming relatively weak in refrigerant. When this occurs the solution must be heated to an increasingly higher temperature to cause expulsion of vapor therefrom which, of course, makes it even more difficult to raise liquid by vapor lift action with pilot flame operation of the burner 15.

In accordance with my invention I provide the vapor lift tube 35 having several paths of flow 45 and 46 for lifting liquid by vapor lift action, whereby raising of liquid can be effected under all operating conditions including those periods when the gas burner is operating with a pilot flame and heat is being supplied to the heating tube 12 at a minimum rate of heat input. The parallel paths of flow 45 and 46 for raising or lifting liquid are formed by a partition or dividing wall 47 which extends lengthwise of and within the lift tube 35.

By subdividing the lift tube 35 into parallel paths of flow in the manner just described, reliable pumping of liquid by vapor lift action can be effected through the lift tube when the thermostatic control functions to cause the gas burner 15 to operate with a pilot or minimum flame. In other words, even at low heat input to the heating tube 12 vapor is expelled from solution at a sufficiently rapid rate in the subdivided passsages 45 and 46 to raise liquid by vapor lift action under the influence of the reaction head formed by the liquid column in the pipe 34. To provide the lift tube 35 of Figs. 1 and 2, the partition or wall 47 may be formed of a strip of sheet metal which is inserted within the tube 35 while the latter is more or less straight, and thereafter the tube may be bent to the shape shown in Fig. 1 preparatory to connecting the ends thereof to the boiler 11 and pipe 34, respectively.

Instead of dividing the lift pipe 35 into parallel paths of flow by a dividing wall or partition, a second smaller pipe may be employed which extends within the lift pipe to form a plurality of parallel fluid passages. Such an arrangement is illustrated in Fig. 3 in which parts similar to those shown in Figs. 1 and 2 are referred to by the same reference numerals followed by the suffix a.

The normal lift pipe 35a is heat conductively connected at 44a to the heating tube 12a, such normal lift pipe when used alone being operable to raise or pump liquid when the burner is operating with a normal or maximum flame and ineffective to raise liquid when the burner operates with a minimum or pilot flame. In Fig. 3 a second smaller pipe 48 extends within the pipe 35a to provide parallel passages 45a and 46a. As in the embodiment of Figs. 1 and 2, vapor is expelled from solution at a sufficiently rapid rate in the subdivided passages 46a and 47a under low heat input conditions to raise liquid by vapor-lift action even when the burner 15 is operating with a pilot or minimum flame.

Another modification of the invention is shown in Figs. 4 and 5 in which the lift tube 35b having an internal diameter of the size of lift tube 35 in Figs. 1 and 2 is not subdivided, but instead is supplemented by a second lift tube 35d of smaller size. In Fig. 4, in which parts similar to those shown in Fig. 1 are referred to by the same reference numerals followed by the suffix b, liquid can be raised from the lower end of pipe 34b through the normal lift tube 35b to the upper part of the boiler 11b which is heat conductively connected at 14b to the heating tube or flue 12b. Absorption solution weak in refrigerant passes from the lower end of boiler 11b and flows to the upper part of the absorber coil, and refrigerant vapor passes from the upper end of boiler 11b through conduit 36b to the condenser in the same manner previously explained in connection with Fig. 1.

The lift tube 35b is of such size that vapor is expelled from solution therein at a sufficiently rapid rate when the burner 15 is operating with a normal or maximum flame, so that liquid can be raised therein by vapor lift action. However, when the burner 15 operates with a minimum or pilot flame, vapor is evolved at a rate insufficient to cause lifting of liquid by vapor lift action through the lift tube 35b. The internal diameter of the second lift tube 35d is such that liquid can be effectively raised therein by vapor lift action when the burner is operating with a pilot flame and heat is being supplied at minimum heat input to the heating flue 12b. In order to promote heat transfer from the heating gases passing through the flue 12b to the inner wall surface thereof, a baffle or heat distributing member 49 desirably is positioned within the flue.

In Figs. 4 and 5 the lift tubes 35b and 35d are heat conductively connected at 50 and 51, respectively, to opposite sides of a plate 52. The heating tube 12b is formed with a vertical slot 53 through which a portion 52′ of plate 52 extends into the interior of heating flue 12b. The combustion or heating gases passing upwardly in the heating flue 12b directly heat the inner portion 52′ of plate 52, whereby heat is effectively conducted to the lift tubes 35b and 35d in thermal relation with the portion of plate 52 disposed exteriorly of heating flue 12b. As in the previously described embodiments, the supplementary effect produced by lift tube 35d insures lifting of liquid even when the gas burner 15 operates with a pilot or minimum flame.

A further embodiment is shown in Figs. 6, 7 and 8 in which a lift tube 35c operable to lift liquid with maximum or normal flame operation of the gas burner is supplemented by the provision of a second smaller lift tube 35e whose function is similar to lift tube 35d in Figs. 4 and 5. In Figs. 6 and 7, in which parts similar to those shown in Figs. 4 and 5 are referred to by the same reference numerals followed by the suffix c, absorption solution enriched in refrigerant can be raised from the lower end of pipe 34c through the normal lift tube 35c to the upper part of boiler 11c which is heat conductively connected at 14c to the heating tube or flue 12c.

Absorption solution weak in refrigerant passes from the lower end of boiler 11c and through a conduit 37c and liquid heat exchanger 32c to the upper part of the absorber coil, in the same manner previously described in connection with Fig. 1. Vapor passes from the upper end of boiler 11c through a conduit 54 to a region of pipe 34c below the liquid level therein. Hence, the upper portion of the liquid column, into which enriched absorption solution is introduced from the liquid heat exchanger 32c and conduit 33c, serves as a submerged analyzer. Vapor then passes upwardly through pipe 34c and conduit 17c to the condenser to be liquefied therein.

The lift tube 35c, as previously explained, is only effective to lift liquid by vapor lift action when heat is supplied at maximum heat input and the gas burner operates with normal or maximum flame. The smaller lift tube 35e is connected in parallel with lift tube 35c and is of such size that liquid can be effectively raised therein by vapor lift action when the burner operates with a pilot flame and heat is being supplied at minimum heat input to the heating flue 12c.

In Figs. 6 and 7 the heating flue 12c is formed with a vertical slot 55. As shown in Fig. 8, such slot may be produced by forming the heating flue 12c from a strip of sheet metal 56 having opposed recesses or notches 57 at the vertical edges thereof. The lift tubes 35c and 35e are heat conductively connected to one another in a lengthwise direction at 58 at the region of the slot 55. Further, the tubes 35c and 35e are bent so that the portion of tube 35c at the region of slot 55 is positioned within the heating flue 12c, as best shown in Fig. 7.

When heat is supplied at maximum heat input to the heating flue 12c and the burner is operating with normal or maximum flame, heat is supplied at such a rate to lift tube 35c that expulsion of vapor takes place from solution in such tube and raising of liquid is effected therein by vapor lift action. However, when the burner operates with a pilot flame, insufficient heating of lift tube 35c is effected to raise liquid therein. Under such conditions heat is conducted from the wall of lift tube 35c to the second lift tube 35e through the heat conductive connection therebetween, and the extent of such heating is sufficient to cause expulsion of vapor at a rate adequate to effect raising of liquid by vapor lift action in lift tube 35e. It is to be understood that heating of lift tube 35c is effected by combustion gases only, and that the flame of the gas burner never impinges the lift tube 35c when operating either with maximum or pilot flame.

Due to the heat conductive connection 58 between lift tubes 35c and 35e, excessive heating of lift tube 35c will be avoided because the temperature of this tube cannot exceed the temperature at which vapor is expelled from solution in lift tube 35e, such vapor expulsion temperature being dependent upon the refrigerant concentration of the solution in the second or supplemental lift tube.

In view of the foregoing, it will now be understood that, in each of the embodiments illustrated and described above, a vertically extending imperforate lift tube or pump pipe is provided for circulating absorption solution in the absorption solution circuit. In the embodiment of Figs. 1 and 2, for example, the pipe 35 serves as such a pump pipe having an inlet at one level and an outlet at a higher level. The pump pipe 35 and boiler 11 constitute a vapor expulsion unit which is heated by suitable heating means. In Fig. 1 the source of heat 15 and heating tube 12 form the heating means. The part of the pump pipe 35, which is heat conductively connected at 44 to the heating tube 12, may be referred to as a heat receiving and vapor forming part which is heated by heat derived from the heating means, and at which region vapor is expelled from solution in the pump pipe 35 to raise liquid therein by vapor-lift action. As previously explained, the expansible fluid thermostat functions to control the device 43, and effect heating of the vapor expulsion unit at a "minimum" or first rate of heat input, or at a "maximum" or second larger rate of heat input.

The cross-sectional area of the pump pipe 35 from the inlet to the outlet thereof is such that raising of liquid by vapor-lift action through a pipe of that size can only be effected when heating of the vapor expulsion unit is effected at the second larger rate of heat input. By providing the partition 47 in Fig. 1, or second small pipes 48, 35d and 35c in Figs. 3, 5 and 7, respectively, an upwardly extending imperforate fluid passageway is provided, which is associated with the pump pipe, and effective to raise liquid therein when heating of the vapor expulsion unit by the heating means is effected at the first or lower rate of heat input.

Such upwardly extending imperforate fluid passages, such as, for example, the passage 45 or 46 in Fig. 1, or the passages formed by the pipes 48, 35d and 35c in Figs. 3, 5 and 7, also include heat receiving and vapor forming parts at the region each is heat conductively connected to the heating tube or flue 12. These heat receiving and vapor forming parts of the fluid passages are also heated by heat derived from the heating tube 12 and heat source 15 to cause expulsion of vapor from solution in such regions, and effect raising of liquid in the fluid passages when heating of the vapor expulsion unit is effected at the smaller or first rate of heat input. In Fig. 1 and the other embodiments, the pump pipe and fluid passage associated therewith each define a path of flow for vapor in the heat receiving and vapor forming parts thereof, which extends upwardly therefrom and in which each longitudinal increment in the upward path of flow for vapor always is at a successively higher level to provide a path of flow for raising liquid in which vapor always rises upwardly therein.

Modifications of the embodiments of my invention which I have described will occur to those skilled in the art, so that I desire my invention not to be limited to the particular arrangements set forth. Therefore, I intend in the claims to cover all modifications which do not depart from the spirit and scope of my invention.

What is claimed is:

1. In absorption refrigeration apparatus, a circuit for circulation of absorption solution including a vapor expulsion unit comprising a vertically extending imperforate pump pipe having an inlet at one level and an outlet at a higher level, heating means for heating said vapor expulsion unit, said pump pipe including a heat receiving and vapor forming part intermediate the inlet and outlet thereof which is heated by heat derived from said heating means to cause expulsion of vapor from solution in said pipe and raise liquid therein by vapor-lift action, means for operating said heating means to effect heating of said vapor expulsion unit at a first rate of heat input or a second larger rate of heat input, the cross-sectional area of said pump pipe from the inlet to the outlet thereof being such that raising of liquid by vapor-lift action through a pipe of that size can only be effected when heating of said vapor expulsion unit by said heating means is effected at the second larger rate of heat input, means associated with said pump pipe to provide an upwardly extending imperforate fluid passage having an inlet at said one level and an outlet at said higher level for raising liquid therein when heating of said vapor expulsion unit by said heating means is effected at the first rate of heat input, said upwardly extending imperforate fluid passage also including a heat receiving and vapor forming part intermediate the inlet and outlet thereof which is heated by heat derived from said heating means to cause expulsion of vapor from solution in said passage and raise liquid therein by vapor-lift action, and said pump pipe and said passage each defining a path of flow for vapor in the heat receiving and vapor forming part thereof which extends upwardly therefrom and in which each longitudinal increment in the upward path of flow for vapor always is at a successively higher level to provide a path of flow for raising liquid in which vapor always rises upwardly therein.

2. Apparatus as set forth in claim 1 in which said means associated with said pump pipe to provide said upwardly extending imperforate passage comprises provisions for subdividing said pipe into a plurality of parallel fluid passages.

3. Apparatus as set forth in claim 1 in which said means associated with said pump pipe to provide said upwardly extending imperforate passage comprises a partition therein for subdividing said pipe into a plurality of parallel fluid passages.

4. Apparatus as set forth in claim 1 in which said means associated with said pump pipe to provide said upwardly extending imperforate passage comprises a second pipe extending lengthwise of and within said pump pipe for subdividing said pipe into a plurality of parallel fluid passages.

5. Apparatus as set forth in claim 1 in which said means associated with said pump pipe to provide said upwardly extending imperforate passage comprises a second pipe disposed exteriorly of said pump pipe and connected in parallel therewith for raising liquid from said one level to said higher level.

6. In absorption refrigeration apparatus, a circuit for circulation of absorption solution including a vapor expulsion unit comprising a vertically extending imperforate pump pipe having an inlet at one level and an outlet at a higher level, means including a fluid fuel burner for heating said vapor expulsion unit, said pump pipe including a heat receiving and vapor forming part intermediate the inlet and outlet thereof which is heated by heat derived from said burner to cause expulsion of vapor from solution in said pipe and raise liquid therein by vapor-lift action, means for operating said burner to effect heating of said vapor expulsion unit at a first rate of heat input or a second larger rate of heat input, the cross-sectional area of said pump pipe from the inlet to the outlet thereof being such that raising of liquid through a pipe of that size can only be effected when heating of said vapor expulsion unit by said burner is effected at the second larger rate of heat input, means including a second pipe associated with said pump pipe to provide an upwardly extending imperforate fluid passage having an inlet at said one level and an outlet at said higher level for raising liquid therein when heating of said vapor expulsion unit by said burner is effected at the first rate of heat input, said second pipe being disposed exteriorly of said pump pipe and connected in parallel therewith, said second pipe having a smaller cross-section than said pump pipe and also including a heat receiving and vapor forming part intermediate the inlet and outlet thereof which is heated by heat derived from said burner to cause expulsion of vapor from solution in said second pipe and raise liquid therein by vapor-lift action, said pump pipe and second pipe each defining a path of flow for vapor in the heat receiving and vapor forming part thereof which extends upwardly therefrom and in which each longitudinal increment in the upward path of flow for vapor always is at a successively higher level to provide a path of flow for raising liquid in which vapor always rises upwardly therein, a vertical heating tube into the lower end of which said burner is arranged to project its flame, and said pump pipe and second pipe being heat conductively connected to one another in a lengthwise direction and arranged to receive heat derived from the heating gases passing through said heating tube which are produced by said burner.

7. Apparatus as set forth in claim 6 in which a portion of said pump pipe is arranged to be contacted by the combustion gases passing through said heating tube.

8. Apparatus as set forth in claim 6 in which said heating tube is formed with a vertical slot, said pump pipe having a portion thereof positioned within said tube at the region of said slot, said second pipe being heat conductively connected to such portion of said pump pipe.

9. Apparatus as set forth in claim 6 in which said heating tube is formed with a vertical slot, and a member within said heating tube having a portion projecting exteriorly of said tube through said slot, said pump pipe and second pipe being heat conductively connected to the exteriorly projecting portion of said member.

10. Apparatus as set forth in claim 9 in which said pump pipe and second pipe are heat conductively connected to opposing sides of said member at the exterior of said heating tube.

11. In absorption refrigeration apparatus, a circuit for circulation of absorption solution including a vapor expulsion unit comprising a vertically extending imperforate pump pipe having an inlet at one level and an outlet at a higher level, means including a fluid fuel burner for heating said vapor expulsion unit, said pump pipe including a heat receiving and vapor forming part intermediate the inlet and outlet thereof which is heated by heat derived from said burner to cause expulsion of vapor from solution in said pipe and raise liquid therein by vapor-lift action, means for operating said burner to effect heating of said vapor expulsion unit at a first rate of heat input or a second larger rate of heat input, the cross-sectional area of said pump pipe from the inlet to the outlet thereof being such that raising of liquid through a pipe of that size can only be effected when heating of said vapor expulsion unit by said burner is effected at the second larger rate of heat input, means associated with said pump pipe to provide an upwardly extending imperforate fluid passage having an inlet at said one level and an outlet at said higher level for raising liquid therein when heating of said vapor expulsion unit by said burner is effected at the first rate of heat input, said upwardly extending imperforate fluid passage also including a heat receiving and vapor forming part intermediate the inlet and outlet thereof which is heated by heat derived from said burner to cause expulsion of vapor from solution in said passage and raise liquid therein by vapor-lift action, and said pump pipe and said passage each defining a path of flow for vapor in the heat receiving and vapor forming part thereof which extends upwardly therefrom and in which each longitudinal increment in the upward path of flow for vapor always is at a successively higher level to provide a path of flow for raising liquid in which vapor always rises upwardly therein.

12. Apparatus as set forth in claim 11 including a vertical heating flue into the lower end of which the flame produced by said burner is adapted to project, said pump pipe and means associated therewith which provides said upwardly extending imperforate fluid passage being arranged to receive heat from combustion gases passing upwardly in said flue.

13. Apparatus as set forth in claim 11 in which said means associated with said pump pipe to provide said upwardly extending imperforate passage comprises a second pipe disposed exteriorly of said pump pipe and connected in parallel therewith, and said heating means includes said burner and a vertical heating flue for combustion gases, said flue having an opening, a member at the exterior of said flue which projects through said slot into said flue, said pump pipe and second pipe being heat conductively connected to said member at the exterior of said flue.

14. In absorption refrigeration apparatus, a circuit for circulation of absorption solution including a vapor expulsion unit comprising a vertically extending imperforate pump pipe having an inlet at one level and an outlet at a higher level, heating means for heating said vapor expulsion unit, said pump pipe having substantially the same cross-sectional area throughout its length and including a heat receiving and vapor forming part intermediate the inlet and outlet thereof which is heated by heat derived from said heating means to cause expulsion of vapor from solution in said pipe and raise liquid therein by vapor-lift action, means for operating said heating means to effect heating of said vapor expulsion unit at a first rate of heat input or a second larger rate of heat input, the cross-sectional area of said pump pipe from the inlet to the outlet thereof being such that raising of liquid by vapor-lift action through a pipe of that size can only be effected when heating of said vapor expulsion unit by said heating means is effected at the second larger rate of heat input, and means associated with said pump pipe to provide an upwardly extending imperforate fluid passage having an inlet at said one level and an outlet at said higher level for raising liquid therein when heating of said vapor expulsion unit by said heating means is effected at the first rate of heat input, said upwardly extending imperforate fluid passage also having substantially the same cross-sectional area throughout its length and including a heat receiving and vapor forming part intermediate the inlet and outlet thereof which is heated by heat derived from said heating means to cause expulsion of vapor from solution in said passage and raise liquid therein by vapor-lift action.

References Cited in the file of this patent

UNITED STATES PATENTS

| Number | Name | Date |
| --- | --- | --- |
| 1,791,441 | Bertsch | Feb. 3, 1931 |
| 1,950,703 | Thomas et al. | Mar. 13, 1934 |
| 2,306,704 | Kogel | Dec. 29, 1942 |
| 2,363,771 | Bergholm | Nov. 28, 1944 |